E. H. WRIGHT.
VEHICLE BODY.
APPLICATION FILED FEB. 21, 1913.
1,176,331.
Patented Mar. 21, 1916.
3 SHEETS—SHEET 1.
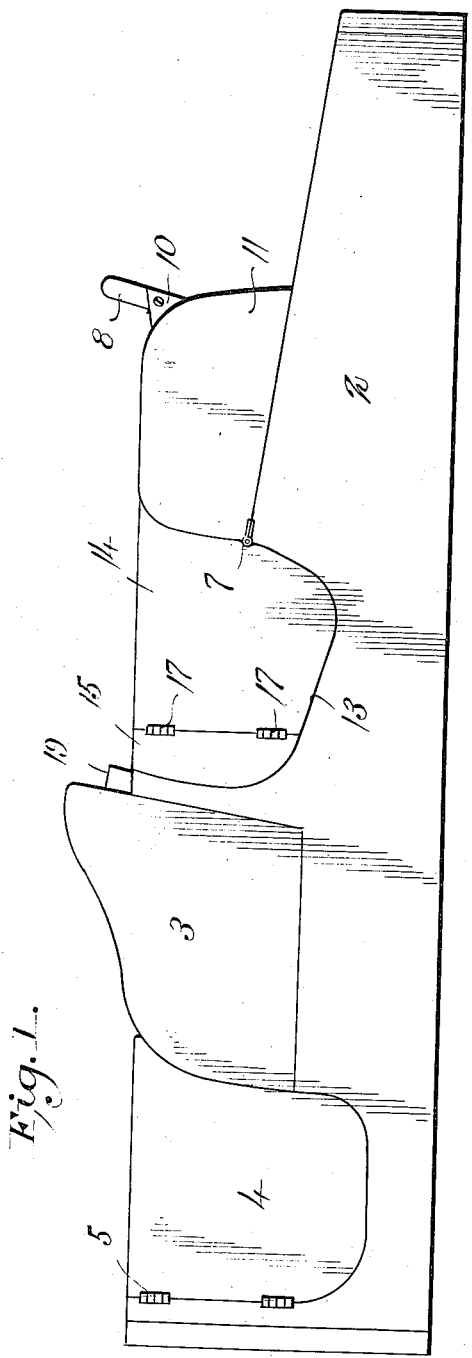
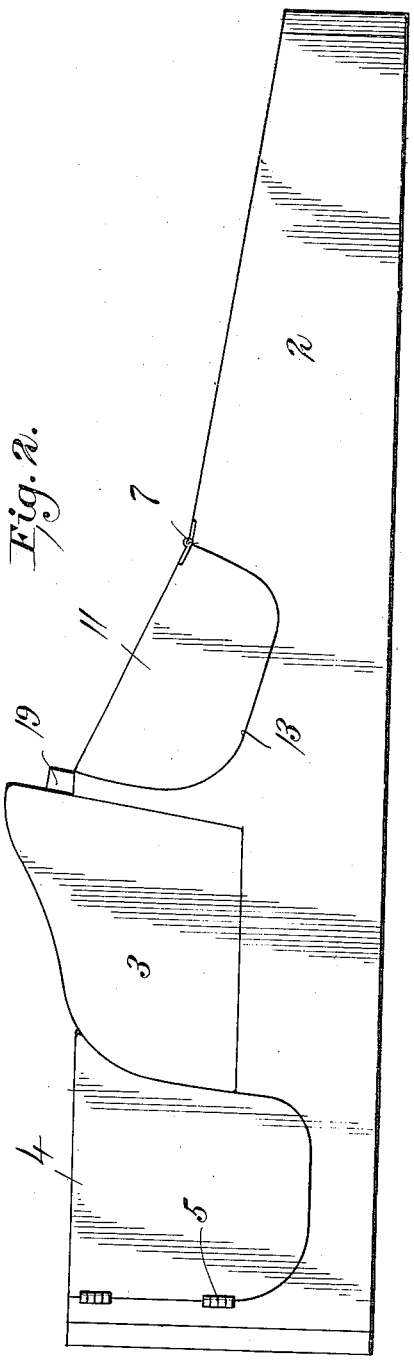
WITNESSES
INVENTOR E. H. WRIGHT.
VEHICLE BODY.
APPLICATION FILED FEB. 21, 1913.
1,176,331.
Patented Mar. 21, 1916.
3 SHEETS—SHEET 2.
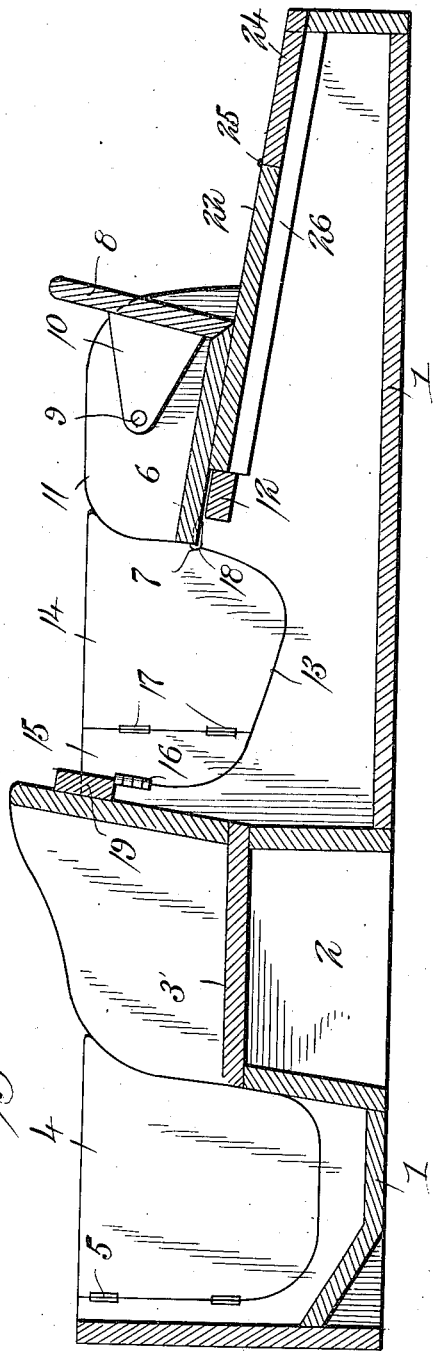
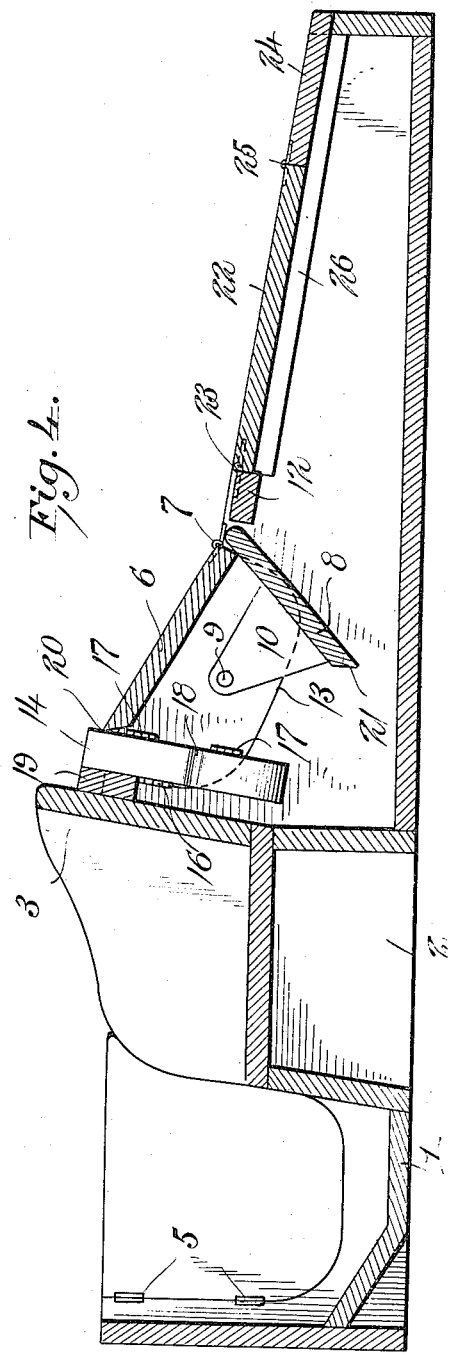
WITNESSES
INVENTOR

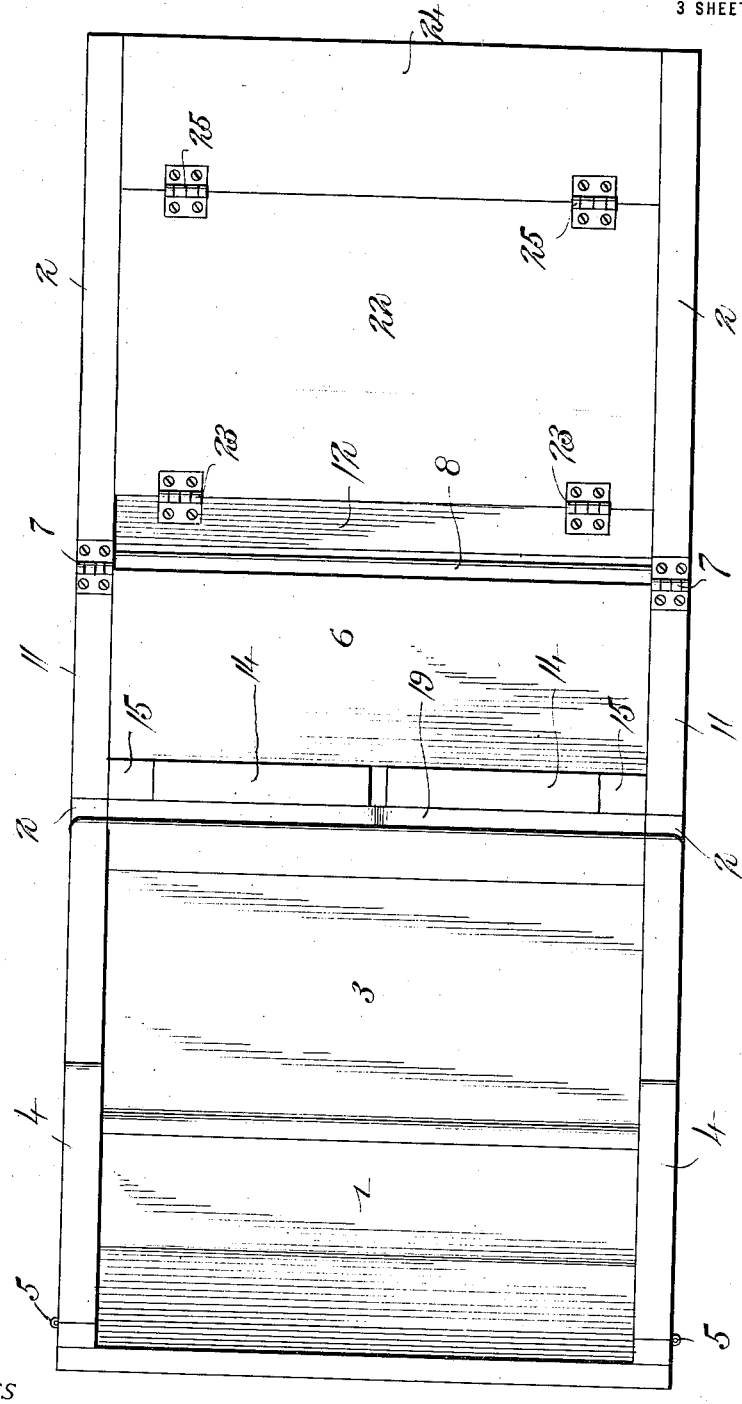

UNITED STATES PATENT OFFICE.

ELLERY H. WRIGHT, OF BRYANT, SOUTH DAKOTA.

VEHICLE-BODY.

1,176,331.  Specification of Letters Patent.  Patented Mar. 21, 1916.

Application filed February 21, 1913. Serial No. 749,932.

*To all whom it may concern:*

Be it known that I, ELLERY H. WRIGHT, citizen of the United States, residing at Bryant, in the county of Hamlin and State of South Dakota, have invented certain new and useful Improvements in Vehicle-Bodies, of which the following is a specification.

This invention relates to convertible vehicles and more particularly to an automobile or other motor vehicle body.

The primary object of the invention is to provide a desirable vehicle body of strong durable construction and of attractive appearance, which can be quickly and easily converted into either a one seated vehicle, capable of use as an uncovered runabout, or into a two seated vehicle capable of use as an uncovered touring car, such conversion in no way destroying the symmetrical outline of the body or rendering portions thereof unbalanced.

A further object of the invention contemplates the provision of simple and efficient means whereby the several embodiments comprising the invention may be folded in such a novel and peculiar manner as to produce a car body of neat and attractive outward appearance.

A still further object of the invention resides in the provision of suitable means whereby the vehicle can be converted from a one to a two seated vehicle, or vice versa, without disconnecting any of the parts, the several parts embodying the invention being so arranged as to fold or fit perfectly within the interior of the car body so as to in no way disfigure or otherwise detract from the outward appearance of the car.

The above and additional objects are accomplished by such means as are illustrated in their preferred embodiment in the accompanying drawings, described in the following specification, and the more particularly pointed out in the claims which are appended hereto and form a part of this application.

In describing my invention in detail reference will be had to the accompanying drawings wherein like characters denote like or corresponding parts throughout the several views, and in which:—

Figure 1 is a side elevation of a car body constructed in accordance with my invention. Fig. 2 is a similar view, the body being shown as a one seated vehicle. Fig. 3 is a longitudinal sectional view of the car body as illustrated in Fig. 1. Fig. 4 is a similar view as illustrated in Fig. 2, and Fig. 5 is a top plan view of the car body as shown in Fig. 2.

Proceeding now to the description of the drawings wherein as illustrated the preferred form of my invention the numeral 1 designates the base of the car body having sides 2 and the usual permanent front or driver seat 3. Doors 4 are hingedly connected as at 5 adjacent the front seat, to facilitate the entrance and exit of persons to the interior of the car. The shape and size of the door 4 may be varied as desired without in any way affecting the utility of the device, as such construction does not form a part of the present invention.

A rear seat 6 is hingedly connected as at 7 to the sides 2 of the vehicle, the said seat being provided with a back 8 pivotally connected as at 9 through the medium of diametrically opposite links 10 extending from the back to the pivot point 9 where the said back is secured to the sides 11 of the seat 6. When the car body is opened as illustrated in Figs. 1 and 3 of the drawings the sides 11 of the seat 6 lie flat upon the sides 2 of the vehicle, while the seat itself rests upon a cross bar 12 connecting the two sides of the car body at a point directly beneath the said seat 6. The car sides 2 are cut away as at 13 adjacent the seat 6 and in the rear of the seat 3 whereby access may be had to the interior of the car body when the said seat 6 is in use. When so used, sectional doors, comprising a main section 14 and a smaller section 15 are adapted to close the cut out portion 13 of the vehicle, the smaller portion 15 being hingedly connected as at 16 to the inner forward edge of the cut out portion 13, while the main section 14 of the door is hingedly connected as at 17 to the said smaller section 15. By this construction it will be seen that swinging of the door in either direction is permitted, the door swinging outwardly upon the hinges 17 and inwardly upon the hinge 16, the purpose of which will hereinafter fully appear. A notch 18 is provided upon one edge of each door portion 14 to permit closing of the latter within the cut out portion 13, the hinge 7 of the rear seat adapted to fit within the said recess 18 when the said door is in closed position.

To fold the seat, as is illustrated in Fig. 4 of the drawings the doors are folded inwardly upon the hinges 16 so as to lie parallel and against a strip 19 secured to the rear face of the forward seat 3. After folding the doors as just described the back 8 of the rear seat is swung upon its pivot until the upper edge of the said back is brought into engagement with the forward edge of the seat 6; whereupon the entire seat is raised upon the hinges 7 and swung until the sides 11 of the seat fit within the cut out portions 13 left vacant by the inward swinging of the doors, the back 8 of the said seat fitting entirely within the interior of the car body as shown in Fig. 4. The rear edge of the seat 6 is beveled as at 20 upon which the beveled edge 21 of the seat back 8 rests, thereby forming a perfect connection between the said seat and the back. When in closed position the said beveled edge 20 comes in contact with the closed doors 14, allowing the sides 11 to fold tightly within the cut out portions 13 of the body sides 2. Access may be had to the rear interior of the car body by reason of a door 22 which is hingedly connected as at 23 to the cross bar 12, the rear extremity of the said door 22 being provided with a subsidiary or supplemental door portion 24 hingedly connected as at 25 to the main portion 22, the said second door 25 permitting access to the interior of the car body when the latter is used as a two seated vehicle, otherwise access could not be had thereto as the rear seat when unfolded is brought into engagement with the said door 22, thereby preventing opening of the door as long as such seat remains intact. A strip 26 is secured upon the inner face of the sides 2 and support the doors 22 and 24 when in closed position.

The advantages of a car body constructed, as above described are numerous. The rear seat 6, when not in use or when folded within the interior of the car body is fully protected by reason of the cover afforded therefor. The novel and peculiar construction of the rear seat sides 11 permits use of the same for a double purpose, the first as sides for the said seat and second as doors for closing the cut out portions 13 of the vehicle sides when the said seat is folded or in closed position; that the creation of a double door at the rear end of the vehicle body permits access to the interior of the car, regardless of the position of the seat 6, as the entire door may be raised when the seat is in folded position and the smaller portion thereof raised or opened when in opened position.

It will be understood from the above taken in connection with the accompanying drawings that the doors 14 fold inwardly in such a manner as to allow the sides 11 to fold or fit within the cut out portions 13; that the pivotal arrangement of the seat back 8 permits folding of the said seat without separating or disconnecting any of the parts thereof and that the entire car body may be converted easily and quickly from a one seated to a two seated car as desired or as occasion demands.

It will be understood that the above description and accompanying drawings comprehend only the general and preferred embodiment of my invention and that various minor changes in the details of construction, proportion and arrangement of parts may be made within the scope of the appended claims and without sacrificing any of the advantages of my invention.

Having thus fully described my invention, what I claim as new and desire to secure by Letters Patent, is:—

1. A convertible vehicle body having a portion of its respective sides cut away to provide spaces therein, a seat movable bodily into and out of a position for use, the sides of the seat when in the latter position fitting the spaces aforesaid, a support for the seat when in use, and doors fitting the spaces mentioned, each door comprising relatively movable door sections, the said sections permitting movement of the doors bodily inwardly and out of the spaces mentioned to provide for movement of the seat in the manner before described.

2. In a convertible vehicle, the combination of a body having sides provided with cut out portions, doors hingedly connected to said sides adapted to swing either inwardly or outwardly from within the said cut out portions, a seat hingedly connected to the sides of said body at the rear of said cut out portions, a seat back pivotally connected to the sides of the said seat, the said back when swung upon such pivots adapted to condition the seat for folding into the interior of the car body the sides of the seat fitting within the cut out portions of the body sides, the doors having been swung inwardly upon the hinges provided for that purpose for converting the body into either a one or a two seated vehicle.

3. In a convertible vehicle, the combination of a body, the sides of which have cut out portions formed therein, doors hingedly connected to the sides of said body portion and normally closing the said cut out portions, the said doors being composed of two independent sections, one of which is hingedly connected to the other for allowing the doors to open either inwardly or outwardly from the said car body, a seat hingedly connected to the sides of said body at the rear of said cut out portions, a back pivotally connected to the sides of said seat, the said back adapted to be swung upon its pivot so as to allow the seat to be swung upon hinges for folding the same within the interior of the car body, the sides of the said seat fitting within the cut out portions, the doors being swung inwardly, the movement of the said seat converting the body into either a one or a two seated vehicle.

4. In a convertible vehicle, the combination of a body having a seat secured thereto, the sides of the said body being provided with cut out portions at the rear of said seat, doors hingedly connected to the sides of said body portion for normally closing the said cut out portions, a seat hingedly connected to the said body sides at the rear of said cut out portion, a back pivotally mounted upon the sides of said seat, the said back when swung upon its pivot adapted to condition the seat for folding inwardly into the interior of the car body, the sides of the said seat fitting within the cut out portions of the body sides, the doors folding inwardly upon their hinges, the movement of the said seat converting the said body into either a one or a two seated vehicle.

5. In a convertible vehicle, the combination of a body having an immovable seat formed thereupon, the sides of the said body having cut out portions formed therein at the rear of said immovable seat, a hingedly connected seat mounted upon the said sides at the rear of said cut out portions, a back pivotally mounted upon the inner face of the sides of said seat, the said back adapted to swing inwardly upon its pivot so as to allow the said seat to fold inwardly into the interior of the car body, the sides of the seat fitting within the cut out portions of the body sides, doors hingedly connected to the said body sides adapted to normally close the said cut out portions, the same swinging inwardly into the interior of the car when the immovable seat is in folded position and means including a pair of hingedly connected doors mounted upon the rear top end of the vehicle body adapted to open upwardly for permitting access to the interior of the said car body.

In testimony whereof I affix my signature in presence of two witnesses.

ELLERY H. WRIGHT.

Witnesses:
WILL CROSSLAND,
O. L. MCLAIN.